Jan. 9, 1945.  A. M. McCONNELL ET AL  2,367,035
TRANSPARENT CANOPY MOUNTING
Filed Oct. 13, 1941  2 Sheets-Sheet 1
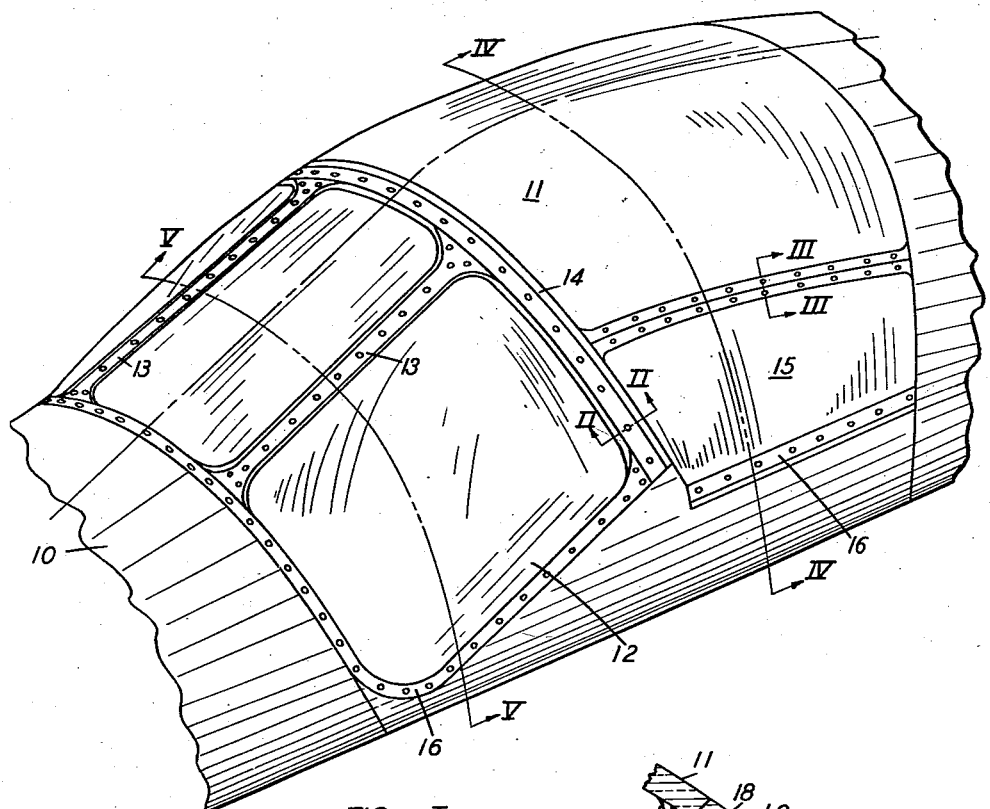
FIG—I
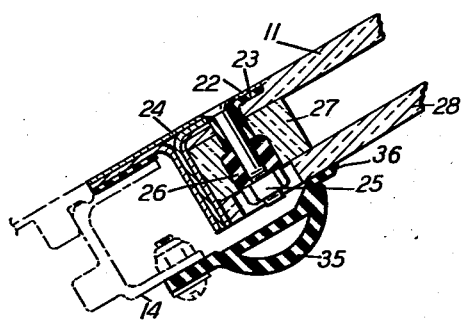
FIG—II
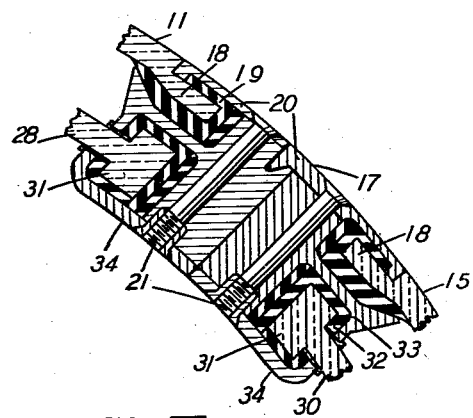
FIG—III
INVENTORS
ALLAN M. McCONNELL
WILLIAM E. BRAHAM
BY George C. Sullivan

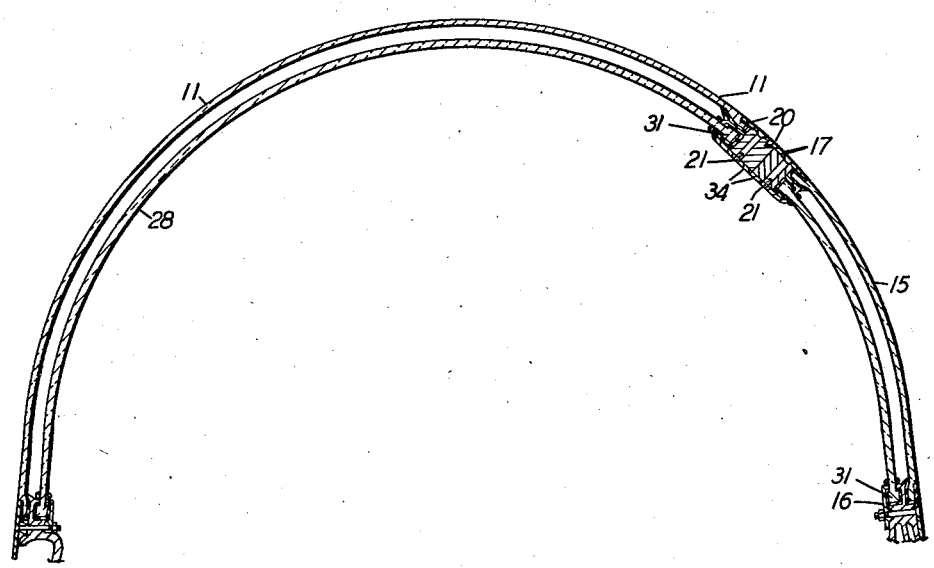
FIG—IV
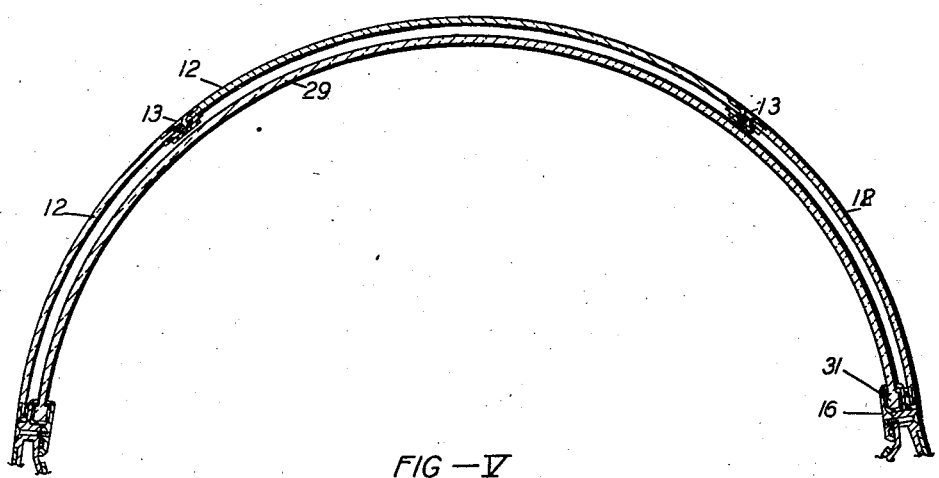
FIG—V
INVENTORS
ALLAN M. McCONNELL
WILLIAM E. BRAHAM
BY George C. Sullivan Patented Jan. 9, 1945

2,367,035

UNITED STATES PATENT OFFICE 2,367,035

TRANSPARENT CANOPY MOUNTING

Allan M. McConnell, Beverly Hills, and William E. Braham, North Hollywood, Calif., assignors to Lockheed Aircraft Corporation, Burbank, Calif.

Application October 13, 1941, Serial No. 414,736

9 Claims. (Cl. 244—121)

This invention relates to a transparent enclosure suitable for windshields and canopies, such as cockpits, gun turrets, and the like, and has special reference to such constructions designed to resist internal or bursting stresses due to supercharging the interior of an airplane for high altitude flights; such supercharging involving a positive internal pressure up to or over ten pounds to the square inch.

It has heretofore been proposed to use laminated glass panels as windshields, but until quite recently such glass panels had to be flat to accommodate manufacturing limitations with regard to laminations. Synthetic resins could be molded to almost any spherical or double curved shape, but have an excessive coefficient of thermal expansion and could not be firmly sealed in position on this account. Moreover, such resins were relatively easily scratched. Because of the low temperatures encountered at high altitudes, frosting of or condensation on the transparent panels has also been a great problem.

It is accordingly an object of this invention to provide an improved transparent arcuate enclosure construction wherein double spaced glazing is used, the outer layer being of any suitable material resistant to abrasion, and being relieved of internal pressures by a synthetic resin spaced inner shell supported at opposite ends to resist the interior pressure by hoop or ring tension in the panel, the free edges of the panel being yieldingly sealed to allow panting or relative movement of the curved panel to compensate for expansion and contraction thereof relative to the fixed outer shell of abrasion resistant material. Thus expansion or contraction of the inner shall changes the radius thereof between its fixed end supports.

It is another object of this invention to provide a transparent enclosure of the type described wherein a cross-section of the enclosure is substantially semicircular, while longitudinal curves are of a minor nature, to facilitate the formation of the transparent material. To this end a cockpit enclosure for example would preferably have an approximately conical forward windshield fairing into the body, together with a cylindrical or barrel shaped cover to provide side and top vision to the pilot. With this arrangement, the inner shell can be mounted in conical and semicircular panels subjected to ring or hoop tension, with a substantial saving in weight due to reduction in the stiffness or rigidity required in both the transparent panels and the mountings therefor.

It is a further object of this invention to provide an improved transparent enclosure of the type described, wherein spaced inner and outer panels are adapted to define a sealed dead air space that can be maintained moisture free by a suitable dessicant connection or heated air supply as desired, thereby providing a non-frosting enclosure even under the extreme temperature differentials which may be encountered in flight.

Other and further important objects of this invention will be apparent from the disclosures in the specifications and the accompanying drawings.

In the drawings:

Figure I is a fragmentary perspective view of a pilot's enclosure embodying the features of this invention in a type suitable for a fighter airplane.

Figure II is an enlarged fragmentary detail section on the line II—II of Figure I showing the seal applied to the free edges of the inner shell.

Figure III is an enlarged fragmentary detail section on the line III—III of Figure I illustrating the tension grips applied to the ends of the inner panels.

Figure IV is a transverse section through the enclosure, taken on the line IV—IV of Figure I.

Figure V is a transverse section through the forward windshield taken on the line V—V of Figure I.

As shown on the drawings:

nacelle 10 wherein the pilot sits within a cockpit Figure I represents the fuselage or control enclosure the outer panel of which is designated generally by the reference numeral 11, which is faired into the forward portion of the fuselage or nacelle by a sloping windshield of generally conical form comprising a plurality of outer panels 12 with intervening supporting posts 13, the windshield and enclosure having a common connection and support that may conveniently be termed a bulkhead ring 14. As shown, the enclosure 11 is provided with a side panel 15 which serves as an escape hatch in an emergency.

As disclosed in the joint application of Theodore Ulmer and Charles E. Sowle, Serial No. 414,748 filed Oct. 13, 1941, the enclosure 11 and escape hatch 15 are mounted to pivot about the right hand (looking forward) edge of the enclosure 11 for normal entrance and exit, and the right hand edge of the enclosure 11 and the lower edge of escape hatch 15 can be simultaneously released to allow the enclosure to blow off. Also the escape hatch 15 can be released from the enclosure 11 and pushed out should the normal means of exit be jammed, as when the ship overturns upon landing.

The outer transparent panels 11, 12, and 15 may be of laminated safety glass, heat treated glass, or hard plastic, some form of glass being preferable for its abrasion resistance. The longitudinal edges of these outer panels are conveniently flush mounted in the posts 13, side frames 16 and a frame 17 between the main enclosure 11 and the escape hatch 15. As shown, the flush mounting is accomplished by providing an offset and rabbeted edge 18 on the outer panels, which edge is embraced in a rubber-like channel 19 and clamped by an overlying plate 20 secured by screws or bolts 21, the rubber-like channel being seated in suitable grooves in the posts or side frames. The transverse edges of the outer panels may be rabbeted as at 22 in Figure II for a rubber-like gasket 23 and a cover plate 24, securing bolts 25 being drawn up against rubber-like plugs 26 in a plastic filler strip 27.

The central enclosure 11, windshield panel 12 and safety hatch are shown as provided with end tensioned transparent arcuate inner panes 28, 29 and 30, respectively, the inner pane 29 of the windshield panels preferably being a single pane approximating the form of a porton of the surface of a cone. The other two panes 28 and 30 approximate the form of a portion of the surface of a bulged cylinder or barrel. In each case the longitudinal or side edges are built up as at 31 to form a grip, being embraced by a rubber channel 32 and retained in a suitable groove or grip in the mounting frame, as at 33 in Figure III, the groove being closed and the grip 31 secured by a flanged inner cover plate 34.

The inner panes 28, 29 and 30 are conveniently formed from one of the hard tough and transparent synthetic resins, such as polymerized acrylate for example, such synthetic resin plastics being available in sheets and being thermo plastic. The grips may be formed on the edges of previously cut sheets by bonding strips of similar material to either or both sides thereof, suitable bonding resulting in the strips becoming an integral part of the sheet of plastic resin. Such resins have an excessive coefficient of expansion with changes in temperature, so that by gripping the sheet along opposite edges the arcuate sheet is subjected to ring or hoop tension which permits a rigid edge mounting, the arc of the sheet changing with expansion or contraction thereof.

In order to seal the space between the inner and outer transparent panels, to cause the inner panel to carry the unbalanced pressure within the cockpit due to supercharging the same for high altitude flight; the free or transverse edges of each panel, which must move in and out with changes in the expansion thereof, are overlaid by a resilient sealing gasket 35, as indicated in Figure II. This gasket is preferably provided with a thin lip 36 to assure better sealing contact with the inner surface of the inner panel, the cockpit pressure assisting in maintaining the seal by acting against the exposed surfaces of the gasket.

By so arranging the inner panels in ring or hoop tension the required thickness thereof is reduced to a minimum, and previous troubles arising from unequal expansion of the plastic and its frame are avoided, as well as troubles due to cracking, chipping or surface crazing of the plastic due to localized strains at bolt holes or from excessive clamping pressure. The provision of firm gripping contacts along the edges while permitting breathing of the arcuate panel eliminates the need of provision for expansion and contraction at the mountings, which would otherwise require that the panels be broken up into smaller panes the expansion of which would be within suitable limits.

It will thus be seen that we have invented an improved and simplified cockpit or other enclosure especially adapted to resist differential pressures.

Having thus described our invention and the present preferred embodiments thereof, we desire to emphasize the fact that many modifications may be resorted to in a manner limited only by a just interpretation of the following claims.

We claim as our invention:

1. A transparent closure for a cockpit or the like having a frame, said closure comprising a transversely arcuate panel of a transparent synthetic resin having two opposite edges approximately parallel to the axis of curvature, said edges being thickened and reinforced to provide a tension grip, gripping means adapted to be secured to the frame, so constructed and arranged as to firmly engage said reinforced edges to support said arcuate panel therefrom, the arch of said panel being free to alter its curvature as expansion and contraction occurs, and yielding sealing means overlying the remaining edges on the positive pressure side thereof, said sealing means being adapted to conform to alterations in curvature of said panel.

2. A transparent closure for a cockpit or the like having a frame, said closure comprising a transversely arcuate polygonal panel of a transparent synthetic resin having two opposite edges approximately parallel to the axis of curvature, said edges being thickened and reinforced to provide a tension grip, gripping means adapted to be secured to the frame so constructed and arranged as to firmly engage said reinforced edges to support said arcuate panel therefrom, the arch of said panel being free to alter its curvature as expansion and contraction occurs, and plastic sealing means sealing the remaining edges to the cockpit and conforming to the movement of the free edges of the panel between the reinforced edges.

3. A transparent inner closure for a cockpit hood comprising a polygonal panel of synthetic resin curved to conform to a generally semi-circular shape, gripping means engaging only the edges of said closure which lie parallel to the axis thereof, the remaining edges of the panel being unrestrained, said gripping means being adapted to sustain hoop tension loads imposed on said closure.

4. A transparent inner closure for a cockpit hood comprising a polygonal panel of synthetic resin curved to conform to a generally semi-circular shape, reinforced means engaging the edges of said closure which lie parallel to the axis thereof, said reinforced means being adapted to sustain hoop tension loads imposed on said closure, the remaining edges of the panel being unrestrained and plastic sealing means conforming to the movement of the free edges of the panel between the reinforced edges.

5. A double paned transparent hood for enclosing pressurized cockpits and the like, comprising an outer shell having one or more panels, a supporting and clamping framework therefor cooperating therewith to secure said load to the margins of the cockpit, said shell having the general form of a convex surface with substantially parallel side edges engaging the side margins of the cockpit, and transverse edges engaging the end margins of said cockpit, an inner shell spaced from and of similar convexity to said outer shell and substantially coextensive therewith, said inner shell having similarly positioned side and transverse edges, means mounting said inner shell by the side edges thereof whereby the inner shell is adapted to expand and contract independently of the outer shell, and means yieldingly sealing the transverse edges of the inner shell to cause the same to sustain the pressure within the cockpit.

6. A double paned transparent hood for enclosing pressurized cockpits and the like, comprising an outer shell having one or more panels, a supporting and clamping framework therefor cooperating therewith to secure said load to the margins of the cockpit, said shell having a general form of a convex surface with substantially parallel side edges engaging the side margins of the cockpit, and transverse edges engaging the end margins of said cockpit, an inner shell spaced from and of similar convexity to said outer shell and substantially coextensive therewith, said inner shell having similarly positioned side and transverse edges, and means rigidly supporting the parallel side edges of said inner shell whereby expansion and contraction of said inner shell will change the convexity of said inner shell between said supporting means.

7. A double paned transparent hood for enclosing pressurized cockpits and the like, comprising an outer shell having one or more panels, a supporting and clamping framework therefor cooperating therewith to secure said load to the margins of the cockpit, said shell having the general form of a convex surface with substantially parallel side edges engaging the side margins of the cockpit, and transverse edges engaging the end margins of said cockpit, an inner shell spaced from and of similar convexity to said outer shell and substantially coextensive therewith, said inner shell having similarly positioned side and transverse edges, means sealingly mounting the parallel side edges of said inner shell, and means yieldingly sealing the transverse edges of said shell, whereby the shell is sealed against outward pressure but free to expand and contract by changes in the transverse curvature thereof.

8. A double paned transparent hood for enclosing pressurized cockpits and the like, comprising an outer shell having one or more panels, a supporting and clamping framework therefor cooperating therewith to secure said load to the margins of the cockpit, said shell having the general form of a convex surface with substantially parallel side edges engaging the side margins of the cockpit, and transverse edges engaging the end margins of said cockpit, an inner shell spaced from and of similar convexity to said outer shell and substantially coextensive therewith, said inner shell having similarly positioned side and transverse edges, said inner shell approximating a semi-circular barrel shape having its axis parallel to the side edges thereof, and means for mounting said side edges in the supporting framework of said outer shell, the transverse edges of the inner shell being unrestrained.

9. A transparent closure for a cockpit or the like having a frame, said closure comprising a transversely arcuate panel of a transparent synthetic resin having two opposite edges approximately parallel to the axis of curvature, said edges being thickened and reinforced to provide a tension grip, gripping means adapted to be secured to the frame, so constructed and arranged as to firmly engage said reinforced edges to support said arcuate panel therefrom, the remaining edges of said panel being free from attachment to the cockpit frame, the arch of said panel is free to alter its curvature as expansion and contraction occurs.

ALLAN M. McCONNELL.
WILLIAM E. BRAHAM.